United States Patent [19]
Stockwell et al.

[11] Patent Number: 5,228,980
[45] Date of Patent: Jul. 20, 1993

[54] FLUIDIZED CATALYTIC CRACKING PROCESS EMPLOYING SHELL-COATED FCC CATALYSTS

[75] Inventors: David M. Stockwell, Iselin; Gerald S. Koermer, Roseland, both of N.J.; William M. Jaglowski, New York, N.Y.

[73] Assignee: Engelhard Corporation, Iselin, N.J.

[21] Appl. No.: 770,069

[22] Filed: Oct. 2, 1991

Related U.S. Application Data

[62] Division of Ser. No. 648,256, Jan. 31, 1991, Pat. No. 5,082,814.

[51] Int. Cl.$^5$ .................. C10G 11/05; B01J 29/06
[52] U.S. Cl. ..................... 208/120; 502/10; 502/68; 208/118; 208/119; 208/121
[58] Field of Search ............... 208/120, 121; 502/10

[56] References Cited

U.S. PATENT DOCUMENTS

| | | | |
|---|---|---|---|
| 4,148,713 | 4/1979 | Rollmann | 208/138 |
| 4,263,128 | 4/1981 | Engelhard | 208/91 |
| 4,325,809 | 5/1982 | Engelhard | 208/91 |
| 4,378,308 | 3/1983 | Angevine et al. | 208/213 |
| 4,394,251 | 7/1983 | Miller | 208/134 |
| 4,427,577 | 1/1984 | Koetsier | 208/111 |
| 4,793,980 | 12/1988 | Torobin | 208/112 |
| 4,938,863 | 7/1990 | Degnan et al. | 208/121 |
| 5,082,814 | 10/1992 | Stockwell et al. | 502/68 |

*Primary Examiner*—Helane Myers
*Attorney, Agent, or Firm*—Inez L. Moselle

[57] ABSTRACT

A novel shell-coated FCC catalyst is disclosed wherein the shell is a mixture of at least one refractory metal oxide or silicate or precursor thereof (preferably clay) having a particle size of 0.3 to 5 microns and an inorganic refractory binder (preferably silica) having a particle size of less than 0.01 microns and the core is a zeolite-containing microsphere. FCC with the shell coated catalyst is also disclosed

7 Claims, No Drawings

FLUIDIZED CATALYTIC CRACKING PROCESS EMPLOYING SHELL-COATED FCC CATALYSTS

This is a divisional of copending application Ser. No. 07/648,256, filed Jan. 31, 1990, now U.S. Pat. No. 5,082,814.

BACKGROUND OF THE INVENTION

1. Field of the Invention

This invention relates to novel shell coated zeolite-containing cracking catalysts having enhanced tolerance towards group VIII, and IB metals; particularly towards nickel, and their use in the catalytic cracking of hydrocarbons into products of lower molecular weight. More particularly, this invention is concerned with fluid catalytic cracking (FCC) operations wherein petroleum feedstocks are cracked into products boiling in the motor fuel range.

FCC has been practiced commercially for many years and, due to increasing economic pressures, the feed materials which the FCC unit must process have become heavier and heavier. As is well known in the art, heavier feed materials such as residual oils contain a significantly larger proportion of metals such as nickel and vanadium which have a documented adverse effect on FCC cracking catalysts.

2. Prior Art

There have been many proposals suggested in the patent and technical literature for dealing with heavy metals in FCC, and these may be broadly classified into those which employ process hardware modifications, and those which entail mainly catalyst modifications.

By way of process modifications, feed additives such as antimony have been used to passivate the metals deposited on the catalyst. Although antimony passivation has been fairly successful, it has not been a complete solution to the problems of metal poisoning.

U.S. Pat. No. 4,263,128 discloses an asphalt residual treating process wherein whole crudes or heavy fractions are contacted in a riser with substantially inert microspheres at elevated temperatures. Metals and Conradson carbon are removed from the hydrocarbon feedstock, but catalytic cracking does not take place. While the metals on the inert contacting material reportedly (U.S. Pat. No. 4,781,818) have low activity for coke and hydrogen, the use or inert contacting material to shield cracking catalyst from poisoning by nickel during FCC was not disclosed.

U.S. Pat. No. 4,938,863 discloses a catalytic cracking catalyst which allegedly can tolerate high levels of vanadium and wherein said catalyst can include a silica coated material. The silica coated material is preferably circulated with a separate metal getter according to the disclosure of U.S. Pat. No. 4,938,863.

Another approach to the problem of metals tolerance is to change only the catalyst. The addition of various materials to an FCC catalyst in order to enhance the same for its resistance or tolerance to metals has been proposed numerous times in the patent art. Thus, for example, U.S. Pat. No. 4,485,184 discloses incorporating into an inert solid matrix a sacrificial trap material which allegedly functions to trap metal. This patent does not disclose a shell concept.

U.S. Pat. No. 4,198,320 discloses adding a colloidal dispersion such as silica and/or alumina to a zeolite containing cracking catalyst. This patent does not disclose the concept of a shell.

Shell catalysts per se are not novel and are disclosed in patents such as U.S. Pat Nos. 4,394,251, 4,793,980, 4,427,577, 4,677,084, 4,378,308, European Patent Application No. 323,735, as well as aforementioned U.S. Pat. No. 4,938,863. However, none of the above patents disclose the particular attrition-resistant coated FCC catalyst of the instant invention.

SUMMARY OF THE INVENTION

The instant invention is directed towards a novel zeolite-containing FCC catalyst, including its use and its method of preparation. The novel catalyst comprises a shell coated zeolite-containing microsphere (preferably zeolite Y) wherein said shell is prepared from two essential components having different particle sizes. The shell is characterized as:

a) having a microactivity (wt % conversion) less than 20 and preferably less than 10 as determined by the procedure of U.S. Pat. No. 4,325,809;

b) either being sinterable or having a surface area of less than $50M^2/g$, preferably less than $25M^{2/g}$ (BET using nitrogen absorption);

c) comprising two essential components of different particle size wherein one component is at least one hydrous refractory metal oxide or silicate or precursors thereof having a particle size of from 0.3 to 5 microns such as hydrous kaolin clay and the other a refractory inorganic binder such as silica having an average particle size of less than 0.01 microns. The expression "sinterable" is intended to mean a material that when subjected to hydrothermal treatment, such as steaming with 100% steam at 1450° C. for 4 hours reduces surface area to less than $50M^2/g$ and preferably less than $25M^2/g$ (BET using nitrogen absorption).

DESCRIPTION OF THE PREFERRED EMBODIMENTS

This invention relates to a novel FCC catalyst including its use in standard FCC operations. The catalyst is a composite microsphere containing an inner core, which is a conventional microsphere, containing zeolite and inorganic binders and/or matrices, plus an outer coating or shell as above set forth.

The catalyst of the instant invention is characterized in that the shell must be 10 to 80% by weight of the final coated catalyst composite. The weight percent loading of the inert coating material on the active cracking component relates directly to the average thickness of the coating. While it has recently become well know (Kluger, E. L. and Leta, D. P., J. Catal., 109, 387 (1988)) that nickel can penetrate catalytically active FCC microspheres to a depth of five microns or more, we have found that nickel penetrates inert microspheres only to similar depths. The thickness, and therefore the weight percent loading of the inert coating on our novel cracking catalysts is therefore a critical parameter. Besides failing to disclose the usefulness of shell coatings in nickel passivation, prior art coatings would not have been thick enough to prevent metals, particularly nickel, from traversing the shell and adversely affecting the cracking selectivity of the zeolite-containing core. Additionally, prior art coatings would have resulted in poor attrition resistance so that the protective coating would be rapidly lost by abrasion during use. Clearly, since the inert shell coating dilutes the active core, too much coating would result in an unacceptable activity reduction, owing to simple dilution. The acceptable dilution level would depend on the activity of the active core. Therefore, the most preferred embodiment of this invention resides in those situations where the shell comprises at least 10% by weight of the final coated microspheres, and the coated catalyst or catalyst blend provides sufficient activity in the conversion of the hydrocarbon feed to be useful in FCC processing.

The weight ratio of hydrous refractory or precursors thereof to binder is also significant. When sodium silicate is used as the binder in combination with the core microspheres described in U.S. Pat. No. 4,493,902, Example 1, it has been found that ratios ranging from 75:25 to 50:50, and most preferably 60:40, provide the excellent results in the novel process of this invention. The optimal ratios are thought to depend on the exact nature of the core microspheres, the binder, and the refractory used in each case, however. Thus refractory to binder ratios of 95:5 to 50:50 may be useful.

Without wishing to be bound to any theory of operation, nevertheless, it appears that the novel shell catalyst of this invention passivates metals by providing an exterior coating made from low surface area or sinterable, weakly interacting support materials. It appears that nickel compounds will absorb and decompose equally well on low surface area, non-acidic, weakly interacting supports, such as clay and silica, as on acidic, strongly interacting supports, such as zeolite or gamma alumina. The advantage of using the non-interacting supports of this invention is that the deposited nickel compounds appear to passivate more readily on these supports, reducing contaminant hydrogen and coke yields. It has been found that nickel is roughly an order of magnitude less active for hydrogen production when supported on clay than when supported on conventional FCC catalyst, so clay is an excellent functional component.

The preferred hydrous refractory used in the novel composition of this invention is a hydrous clay, particular preference being given to hydrous kaolin-type clays, such as ASP ® 600 clay marketed by Engelhard Corporation. Any other finely divided, dispersable source or precursor of a hydrous refractory oxide or silicate could be used, such as diaspore or a titania hydrogel. The particle size of the hydrous refractory is measured by conventional sedigraph equipment, e.g., SEDIGRAPH ® 5000 analyzer and should be smaller than the average thickness of the shell, and be capable of suspending active core microspheres in a slurry with the binder.

A preferred binder is a sodium silicate solution. The sodium silicate should be one having a sufficiently high $Na_2O/SiO_2$ ratio to be soluble at the concentration that is used. Commercial sodium silicate such as N ® Brand, $Na_2O/SiO_2$ equal to about 0.31, can be used. It appears that sodium prevents the silicate from undesirable gelling. This sodium silicate is supplied as a solution containing about 62% by weight of water and can be used without dilution or further concentration. Additionally, sodium silicate can have a higher $Na_2O/SiO_2$ molar ratio than 0.31, i.e., a ratio of about 0.4 to about 0.55. Solutions which have $Na_2O/SiO_2$ in the latter range are referred to herein as sodium di-silicate although the silica content may be somewhat less or more than that of the material whose analysis corresponds to $Na_2O:2.0 SiO_2$.

Other binders can be used, providing that said materials have the required particle size which is maintained so that the formation of gels is minimized, both during the preparation of the slurry and during introduction of the same to the spray dryer, and providing that these binders lead to good attrition resistance. For example, some commercial colloidal silicas, such as Ludox ® AS-40, which has a particle size greater than 0.01 microns, are not operable in the novel process of this invention, as a result of poor attrition resistance, even though they may allow for spray-drying.

Various methods are known in the art for preparation of colloidal silicas, having an average particle size of less than 0.01 microns, which can be used to prepare attrition-resistant FCC catalysts. Some of these colloidal dispersions include small amounts of aluminum or ammonium. These materials are included within the scope of this invention. Binders of this type are disclosed in U.S. Pat. Nos. 3,957,689, 4,086,187 and 3,867,308, the entire disclosures of which are incorporated herein by reference. When these hydrosols are used as binders in the present invention, the hydrous refractory such as clay plays an additionally critical role in suspending the microspheres in the slurry to be spray-dried. Without sufficient hydrous refractory, the active core microspheres settle out of the slurry.

While useful coated catalysts may be prepared using these fine particle size colloidal silicas as binders, as indicated earlier, the particular preferred binder is a sodium silicate, including sodium di-silicate.

The binder solution or colloidal dispersion must have sufficient stability to prevent substantial gel formation during the preparation of the slurry or introduction thereof into the feed lines of the spray dryer, so as to avoid plugging or clogging. The silica or silicate does form a gel or otherwise dry to a mixture of hydrated ionic solids during spray drying, and the manner of this drying is additionally critical. More specifically, the hydrous refractory and binder slurry in the atomized droplet must wet the surface of the active core microsphere initially, and subsequently adhere and shrink onto the active core microsphere during drying. We have found that if the binder is insufficiently stable towards gelling, or if too little hydrous refractory such as clay is used, or sometimes if the spray-drying temperature is too high, the shell material will have a tendency towards forming balloon-like microspheres with the active core attached to the inner wall. The user of the materials of this invention leads to the formation of a dense shell coating integral with the active core and substantially free of voids, other than the pore volume required for catalytic activity and selectivity.

While not wishing to be bound by any theory of operation, nevertheless, it would appear that the use of a binder by itself could lead to a substantial reduction of the active core catalyst microsphere pore volume and activity, owing to pore plugging by the binder. It appears that the inclusion of the instant hydrous refractory with the binder serves to significantly diminish the activity penalty beyond dilution which one can pay when coating an FCC cracking catalyst with a shell.

It is clear that if a coated cracking catalyst consists of 33% by weight of an inactive shell material, its cracking activity should decline 33% by dilution relative to the uncoated active core. If, in fact, its activity declines by a factor which is substantially in excess of that normally expected by dilution, its usefulness as an FCC catalyst becomes severely diminished.

The active core inside the novel catalyst of this invention is an FCC cracking catalyst in which the particles contain crystals of at least one zeolitic molecular sieve component, e.g., a synthetic faujasite, preferably zeolite Y (including ultrastable Y, dealuminated and/or rare earth exchanged Y); or other molecular sieve, such as ZSM-5, zeolites L, omega, and the like, and a non-zeolitic component, such as silica, alumina, clay, or clay residue.

The active core catalyst can be prepared in one of the general methods well known in the art. One method is the so-called gel or incorporation method, wherein a finely divided faujasite is mixed with a gel, such as a silica-alumina gel, together with conventional additives, such as clay, and the material spray-dried to produce microspheres of a size suitable for FCC processing. Colloidal binders may also be used, as disclosed in U.S. Pat. Nos. 3,957,689, 3,867,308, and 4,086,187. Although the present invention may also use these binders, our invention differs critically in that our zeolite is present as microspheres, not finely divided powders, during the second spray-drying step.

Other methods for the preparation of the core material are the so-called in-situ procedures, such as those described in U.S. Pat. Nos. 3,467,718 and 3,663,165. As is well known in the art, in situ procedures involve spray-drying a source of clay and thereafter converting the microspheres into zeolites.

In any event, irrespective of whether an incorporation method or an in situ method is used, the zeolite-containing material is then added to a slurry of said hydrous refractory and said binder, such as sodium silicate, and thereafter spray-dried again in order to produce the novel shell-coated catalyst of this invention. It is to be immediately understood that it is not possible to prepare the instant shell-coated catalyst by techniques such as immersion or merely spraying or impregnating a slurry of hydrous refractory and binder onto the core microspheres.

Conventional spray dryers can be used to convert the mixture of microspheres, binder and hydrous refractory into microspheres having an average diameter in the FCC range, i.e., around 60–80 microns. Conventional inlet temperatures in the range of about 400° to about 1100° F. are recommended but higher or lower temperatures can be used as is known in the art.

Following the second spray drying step, the shell-coated microspheres are then treated in one of two ways. If the source of binder was sodium silicate or a sodium-containing colloid or gel, then, quite obviously, the material contains sodium which must be removed by conventional base exchange techniques. The zeolite can be exchanged with sources of rare earth ions, ammonium ions, hydrogen ions, or mixtures thereof in order to reduce the sodium content. In the case where sodium silicate is the binder, a preferred exchange procedure is that set forth in U.S. Pat. No. 4,699,893, the entire disclosure of which is herein incorporated by reference. After the material has been base exchanged, it is usually rinsed with water and dried.

In those situations where a binder is used which is substantially free of sodium, such as ammonium polysilicate or ammonium-treated colloidal silica, then it is possible to conduct the exchange after the first spray drying step, i.e., after the core microspheres are initially formed and before the shell coating is placed thereon. Alternatively, the exchange can be carried out after the shell coating has been placed on the catalyst. Quite obviously however, the condition of the zeolitic core microspheres during the preparation of the coating slurry must be consistent with the conditions known not to induce gelling of the binder being used. These conditions are generally set forth in the patents which disclose the binders.

After base exchange, the material is treated in a conventional manner by washing with water, drying and subjecting the same to calcining or steaming at elevated temperatures for periods of time ranging from 1 to 48 hours or more.

The shell-coated catalysts of this invention are suitable for use in standard FCC processing of nickel-contaminated feeds. FCC is well known in the art and described in numerous patents such as U.S. Pat. Nos. 4,923,594 and 4,493,902, the entire disclosures of which are incorporated herein by reference.

The following examples will now illustrate the novel process of this invention:

In Examples 1–3 which follow, a typical sodium Y-containing control was made from commercial microspheres that were initially a 35/65 mix of metakaolin and kaolin that had been calcined through its exotherm, without substantial formation of mullite. The microspheres were crystallized to contain zeolite Y prior to coating them with clay. A typical crystallization procedure is disclosed in U.S. Pat. No. 4,493,902, the entire disclosure of which is herein incorporated by reference. (See Example 1, col. 16, line 30, to col. 17, line 33.)

EXAMPLE 1

100 parts of the control microspheres were washed twice with deionized water and added to a slurry prepared by adding 20 parts of silica derived from sodium di-silicate (SDS) (typically 27 wt. %, $SiO_2$, 14 wt. % caustic as $Na_2O$, balance water) to 30 parts of ASP ® 600 hydrous kaolin clay, all on a volatile-free basis. To this slurry was added enough water to obtain a viscosity of about 800 to 1100 cps. The slurry was mixed for about 3 hours and then spray dried in a nozzle-type dryer manufactured by Stork-Bowen. The microspheres (~60%) were colleted and the fines (~17%) discarded. About 23% of the feed solids were lost to the baghouse or deposited on the walls of the unit.

One part of the spray-dried microspheres were then neutralized by cofeeding the same with concentrated $HNO_3$ into two parts of water, initially at room temperature, followed by heating for 1 hour at 180° F., all at pH=5.0. The neutralized products were then ammonium exchanged twice, heat treated at 1100° F. for 3 hours, then ammonium exchanged four more times.

EXAMPLE 2

The procedure of Example 1 was repeated with the exception that the slurry was mixed for about 1 hours prior to spray drying.

EXAMPLE 3

The procedure of Example 1 was repeated with the exception that the slurry was mixed for less than about 5 minutes prior to spray drying. This was accomplished by slurrying together the core microspheres, clay and water without the binder. Just before spray drying, appropriately proportioned aliquots of the core-clay-water slurry and SDS were combined at high shear in a Waring Blendor ® mixer. After the brief mixing period, the aliquots were immediately spray dried.

The catalysts of Examples 1–3 were evaluated by MAT testing referenced in U.S. Pat. No. 4,493,902 at col. 3, lines 30–50. Prior to testing, each catalyst was deactivated by treating with 100% steam at 1,450° F. for four hours.

The results of such testing (carried out in duplicate) as well as various properties of the catalysts are shown in the following table:

TABLE 1

Miscellaneous Physical and Chemical Inspections for Shell Catalysts

| Example | 1 | | 2 | | 3 | |
|---|---|---|---|---|---|---|
| $SiO_2$, wt. % | 60.90 | | 60.00 | | 60.60 | |
| $Al_2O_3$, wt. % | 36.70 | | 37.70 | | 36.70 | |
| $Na_2O$, wt. % | 0.41 | | 0.39 | | 0.32 | |
| BET $M^2/G$ | 285.00 | | 293.00 | | 290.00 | |
| MSA $M^2/G$ | 88.00 | | 94.00 | | 91.00 | |
| ZSA $M^2/G$ | 197.00 | | 199.00 | | 199.00 | |
| XRD % Y, wt. % | 40.00 | | 35.00 | | 41.00 | |
| *UCS, Angstroms | 24.61 | | 24.60 | | 24.63 | |
| **Roller ($-150\ \mu$) | 6.14 | | 6.00 | | 5.43 | |
| ***APS ($-150\ \mu$) | 86.00 | | 93.00 | | 88.00 | |
| Conv., wt. % | 73.50 | 71.31 | 71.22 | 71.97 | 74.19 | 71.45 |
| Activity | 2.77 | 2.49 | 2.48 | 2.57 | 2.87 | 2.50 |
| $H_2$, wt. % | 0.06 | 0.06 | 0.06 | 0.06 | 0.07 | 0.06 |
| $CH_4$, wt. % | 0.45 | 0.47 | 0.44 | 0.45 | 0.51 | 0.49 |
| Ethylene, wt. % | 0.61 | 0.61 | 0.56 | 0.58 | 0.67 | 0.66 |
| Ethane, wt. % | 0.34 | 0.34 | 0.32 | 0.33 | 0.36 | 0.34 |
| Dry Gas, wt. % | 1.59 | 1.60 | 1.51 | 1.55 | 1.75 | 1.69 |
| LPG, wt. % | 14.76 | 14.40 | 14.19 | 14.40 | 15.83 | 15.13 |
| Gasoline, wt. % | 52.95 | 50.99 | 51.46 | 51.99 | 52.72 | 50.84 |
| LCO, wt. % | 16.55 | 16.99 | 17.32 | 16.98 | 16.51 | 17.18 |
| Bottoms, wt. % | 9.96 | 11.69 | 11.46 | 11.06 | 9.30 | 11.37 |
| Coke, wt. % | 4.19 | 4.32 | 4.07 | 4.03 | 3.89 | 3.79 |
| $C_3=/TotC_3$ mol/mol | 0.73 | 0.72 | 0.74 | 0.74 | 0.73 | 0.73 |
| $C_4=/TotC_4$ mol/mol | 0.31 | 0.29 | 0.31 | 0.31 | 0.31 | 0.30 |
| $iC_4/Tot\ C_4$ mol/mol | 1.94 | 2.04 | 1.87 | 1.86 | 1.93 | 1.96 |
| $H_2$/Act, wt. % | 0.02 | 0.02 | 0.02 | 0.02 | 0.02 | 0.02 |
| Coke/Act, wt. % | 1.51 | 1.74 | 1.65 | 1.57 | 1.35 | 1.51 |

*UCS = Faujasite unit cell size
**Roller = 20–80 min. loss, wt. %/hr.
***APS = Average particle size in microns In the above table, the Roller value is a measure of attrition resistance and is determined by the method described in the Appendix.

The lower the number, the more attrition resistant is the catalyst. Results of less than 10 wt. %/hr. are considered acceptable.

The above data demonstrated that the catalysts of Examples 1-3 are viable catalysts with activities and selectivities (on a clean basis) comparable to some commercial catalysts. Attrition test results are good—comparable to commercial FCC catalysts.

EXAMPLE 4

A shell catalyst prepared in accordance with Example 1 and a non-shell Y-containing control catalyst prepared in accordance with the general procedure of EPA 0,194,101 were steamed as pure components at 1350° F., 1400° F., 1450° F. and 1500° F. in 100% steam for 4 hours. Each of the samples was then blended with an activity adjusting component prepared by spray drying a slurry of hydrous kaolin to form microspheres and calcining the microspheres substantially as described in U.S. Pat. No. 4,493,902 at col. 16, lines 6-15. The blending was such that the 1500° F. samples would have equal activity.

Both the control and shell coated catalysts were subjected to the MAT testing previously described with comparable results.

EXAMPLE 5

Nickel Tolerance of Shell Catalysts

The catalyst prepared in Example 1 was evaluated for nickel tolerance. Pure component shell catalysts and the control described in Example 4 were presteamed at 1200° F., 100% steam, for 4 hours, then placed in an automated fixed fluidized bed (FFB) cyclic cracking/regeneration unit. Nickel naphthenates were dissolved in a midcontinent gasoil and the doped gasoil fed to the fluidized catalyst at about 900° F. Catalyst/oil ratios were between 1.8 and 5. After the cracking cycle, air and nitrogen, but no steam, were fed and the temperature was increased to 1400° F. to regenerate the catalyst. The cracking/regeneration cycles were repeated between 5 and 30 times to give the desired Ni loading. Following the FFB deposition of Ni, the catalysts were steamed at 1450° F., 90% steam, 10% air, 4 hours, to deactivate the catalyst and sinter the Ni. MATs were run on 50/50 blends of FFB Ni/catalyst with clean activity adjuster described in Example 4. Results for a series of runs are shown in the following table;

TABLE 2

Nickel Tolerance of Coated Catalysts

| Example | 1 | 1 | Control | Control | Control |
|---|---|---|---|---|---|
| Nickel (ppm) | 2,378 | 2,328 | 2,093 | 2,061 | 1,986 |
| Microactivity Test Results: | | | | | |
| Conversion (wt. %) | 59.43 | 58.11 | 65.63 | 63.90 | 61.66 |
| Activity | 1.46 | 1.39 | 1.91 | 1.77 | 1.61 |
| H2 (wt. %) | 0.21 | 0.23 | 0.51 | 0.40 | 0.41 |
| Dry Gas (wt. %) | 1.10 | 1.17 | 1.71 | 1.56 | 1.54 |
| LPG (wt. %) | 10.05 | 10.13 | 10.95 | 12.36 | 11.33 |
| Gasoline (wt. %) | 44.98 | 43.86 | 47.69 | 45.76 | 44.23 |
| LCO (wt. %) | 21.59 | 21.51 | 20.78 | 20.19 | 20.84 |
| Bottoms (wt. %) | 18.99 | 20.39 | 13.59 | 15.91 | 17.51 |
| Coke (wt. %) | 3.32 | 2.96 | 5.28 | 4.23 | 4.57 |
| H2/Activity (wt. %) | 0.14 | 0.17 | 0.27 | 0.23 | 0.25 |
| Coke/Activity (wt. %) | 2.27 | 2.13 | 2.76 | 2.39 | 2.84 |

The data presented in the table report the results of two FFB runs on the catalyst of the invention, Example 1, and three FFB runs on the control catalyst described in Example 4, all at similar nickel loadings on the catalysts. The MATS were run in duplicate and averaged yields are given. The data shows that the hydrogen yields were dramatically lower on the coated catalyst of the invention, as compared to the control. Naturally, the conversion in these tests were somewhat lower using the coated catalyst, owing to the dilution effect discussed above. The hydrogen yield per unit MAT activity was also substantially reduced on the coated catalyst of the invention however, so that reduced hydrogen yields will also be obtained when the two catalysts are compared at equal MAT conversion.

The coke selectivity, defined as wt % coke/activity, was also lower on the catalyst of the invention, owing to reduced contaminant coke yields due to nickel.

EXAMPLE 6-9

Effect of Binder Level and Clay Type on Attrition

Slurries containing reduced amounts of sodium disilicate (SDS) binder and different types of kaolin clay were prepared and spray-dried for the acid-neutralized products in the following table. In these examples, the same core containing Y zeolite was employed as in Examples 1-3.

TABLE 3

Roller Attrition Results are Poor for Reduced Binder Levels

| Example | 6 | 7 | 8 | 9 |
|---|---|---|---|---|
| Clay Type | ASP ®-600 | ST-2 | ST-1 | ASP ®-600 |
| Slurry Ratios | | | | |
| Clay | 40 | 40 | 40 | 35 |

TABLE 3-continued

Roller Attrition Results are Poor for Reduced Binder Levels

| Example | 6 | 7 | 8 | 9 |
|---|---|---|---|---|
| Silica | 10 | 10 | 10 | 15 |
| Microspheres | 100 | 100 | 100 | 100 |
| Slurry Components | | | | |
| Kg Clay (VF) | 0.600 | 0.600 | 0.600 | 0.525 |
| Kg Clay (As is) | 0.694 | 0.600 | 0.600 | 0.608 |
| Kg SiO2 (VF) | 0.150 | 0.150 | 0.150 | 0.225 |
| Kg 44% SDS | 0.556 | 0.556 | 0.556 | 0.833 |
| Kg MS (VF) | 1.500 | 1.500 | 1.500 | 1.500 |
| Kg added DI | 1.988 | 1.983 | 1.883 | 1.683 |
| Roller Attrition Testing (RAT) | | | | |
| 0–20 min., wt. % | 18.86 | 27.14 | 25.71 | 16.00 |
| 20–80 min., wt. % | 11.71 | 4.71 | 6.29 | 12.29 |
| Microtrack Analysis | | | | |
| PSD, 0–20µ | 0 | 0 | 0 | 0 |
| PSD, 0–40µ | 7 | 9 | 6 | 8 |
| PSD, 0–60µ | 18 | 23 | 23 | 20 |
| PSD, 0–80µ | 37 | 38 | 42 | 36 |
| PSD, APSµ | 94 | 95 | 90 | 97 |
| BET M²/g | 365 | 365 | 384 | |
| MSA M²/g | 74 | 67 | 78 | |
| ZSA M²/g | 291 | 298 | 306 | |

ST-2 Satintone ® No. 2 calcined kaolin (Engelhard Corporation)
ST-1 Satintone ® No. 1 calcined kaolin (Engelhard Corporation)

As can be seen from the above table, poor attrition was obtained either with hydrous clay (ASP ® 600) or calcined clay (ST-1 and ST-2) when the silica was reduced to 20% of the shell (Examples 6–8) or 30% of the shell (Example 9). Most of the attrition loss occurred in the first 20 minutes of the test. The favorable losses between 20 and 80 minutes correspond to the attrition resistance of the underlying core and not the shell.

EXAMPLES 10–13

These examples illustrate that colloidal silica sols, having a particle size greater than 0.01 microns, such as Ludox ® AS-40 (E. I. duPont de Nemours), cannot be used as the source of silica to prepare the shell-coated catalysts of this invention. The resulting materials have poor attrition resistance thereby precluding their use in FCC operations.

In Examples 10–13, the shell loading was 50 parts by weight to 100 parts by weight of core. Two different cores were used—one identified as X-4344 and the other as X-2547.

Fresh, ammonium-exchanged cores were slurried with the Ludox ®, water and ASP ® 600 (when used) at viscosities of 500–1800 cps and spray-dried in a Stork-Bowen nozzle dryer. The samples were then calcined to harden the shell. Some sodium contamination was found in Example 13 so it was ammonium-exchanged to 0.38 wt. % Na2O before calcination.

The data obtained is set forth in the following table;

TABLE 4

Physical Properties of Coated Catalysts Made With Ludox ®

| Examples | 10 | 11 | 12 | 13 |
|---|---|---|---|---|
| Materials | | | | |
| Clay | ASP ®-600 | ASP ®-600 | ASP ®-600 | None |
| Silica | AS-40 | AS-40 | AS-40 | AS-40 |
| Microspheres | X-4344 | X-4344 | X-4344 | X-2547 |
| Slurry Ratios | | | | |
| Clay | 35 | 30 | 25 | 0 |
| Silica | 15 | 20 | 25 | 50 |
| Microspheres | 100 | 100 | 100 | 100 |
| Spray-dryer Specifications | | | | |
| Viscosity (cps) | 1780 | 1760 | 1760 | 675 |

TABLE 4-continued

Physical Properties of Coated Catalysts Made With Ludox ®

| Examples | 10 | 11 | 12 | 13 |
|---|---|---|---|---|
| Inlet (°C.) | 475 | 475 | 475 | 350 |
| Outlet (°C.) | 135 | 135 | 135 | 120 |
| Physical Inspections of the Whole Products | | | | |
| Fresh B. D. | 0.81 | 0.79 | 0.76 | 0.90 |
| Microtrack | | | | |
| 0–20µ | 0 | 0 | 0 | 2 |
| 0–40µ | 1 | 5 | 3 | 7 |
| 0–60µ | 15 | 17 | 19 | 12 |
| 0–80µ | 35 | 35 | 39 | 26 |
| APSµ | 96 | 95 | 92 | 105 |
| Calcined[a] | 1100° F. | 1100° F. | 1100° F. | 1150° F. |
| RAT | | | | |
| 0–20 | 21 | 18.86 | 18.00 | 21.57[b] |
| 20–80 | 11.43 | 11.43 | 11.29 | 12.57[b] |
| 0–80 | 32.43 | 30.29 | 29.29 | 34.14[b] |
| Calcined[a] | | 1500° F. | | |
| RAT | | | | |
| 0–20 | | 16.57 | | |
| 20–80 | | 16.86 | | |
| 0–80 | | 33.43 | | |

[a] Calcined 1100° F., 3 hrs, open trays, no water cold start; or calc. 1150° F., 2 hrs, closed + 25% water, hot start; or calc. 1500° F., 3 hrs, closed + 25% water, cold start.
[b] RAT data obtained on the −150µ fraction of this sample.

As can be seen from the above table, reasonable bulk densities (B.D.) and particle size distributions were obtained. However, when the catalysts were calcined, the Roller Attrition Test (RAT) results were poor.

The X-4344 and X-2547 core materials had the properties set forth below:

TABLE 5

Properties of Core Catalyst

| | | X-4344 | X-2547 |
|---|---|---|---|
| VM | (wt %) | 13.00 | 12.73 |
| Al2O3 | (wt % VM) | 38.93 | 38.86 |
| SiO2 | (wt % VM) | 56.50 | 57.88 |
| Na2O | (wt % VM) | 0.24 | 0.25 |
| TiO2 | (wt % VM) | 1.66 | 1.60 |
| Fe2O3 | (wt % VM) | 0.37 | 0.41 |
| CaO | (wt % VM) | 0.03 | 0.02 |
| MgO | (wt % VM) | 0.28 | 0.02 |
| K2O | (wt % VM) | 0.13 | 0.03 |
| ReO | (wt % VM) | 0.89 | 0.07 |
| P2O5 | (wt % VM) | 0.16 | 0.10 |
| NH4 | (wt %) | 1.93 | 1.68 |
| RAT | (20–80, wt. %/hr.) | 9.55 | 8.66 |

EXAMPLES 14–16

These examples will demonstrate the improved results obtained when a clay-silica shell is used as opposed to a silica only shell.

Two sets of experiments were run comparing shells made only with silica (Example 14) and shells made with silica and clay (Example 15).

In both sets of Examples, N ®Brand sodium silicate was used (28.7%) wt. % SiO2, 8.9 wt. % Na2O, balance water) and the core was the same core as used in Example 1.

The silica-only shell catalyst was 50 SiO2:100 core and the silica-clay shell catalyst was 30 clay:20 silica:100 core. The clay used in Example 15 was ASP ®-600.

In addition, a control was run (Example 16) which is the same microsphere core used in Examples 14 and 15 but uncoated.

Aqueous slurries were prepared and spray dried in a Stork-Bowen Nozzle dryer at the following conditions:

TABLE 6

| Examples | 14 | 15 | 16 |
|---|---|---|---|
| Slurry ratios | | | |
| ASP ®-600 | 0 | 30 | 0 |
| Silica | 50 | 20 | 0 |
| Slurry and Spray-dryer Specifications | | | |
| Solids | 55.6 | 51 | — |
| Viscosity, CP | 750 | 1,000 | — |
| Inlet Temp., °C. | 350 | 350 | — |
| Outlet Temp., °C. | 120 | 120 | — |
| Nozzle No. | 8 | 8 | — |

The products of Example 14 and 15, as well as the control of Example 16, were acid neutralized at a pH of 5 with nitric acid and the −150 micron fraction ammonium exchanged five or six times to yield catalysts with the properties listed below.

TABLE 7

| Examples | 14 | 15 | 16 |
|---|---|---|---|
| Na$_2$O, wt. % VF | 0.29 | 0.40 | 0.31 |
| % Na Exchd | 98.15 | 96.36 | 97.13 |
| Al$_2$O$_3$, wt. % VF | 27.70 | 35.30 | 39.70 |
| SiO$_2$, wt. % VF | 70.00 | 61.50 | 56.60 |
| Surface Area (SA) M$^2$/G | 277.00 | 292.00 | 413.00 |
| Matrix SA M$^2$/G | 88.50 | 83.20 | 126.00 |
| Zeolite SA Mphu 2/G | 188.50 | 208.80 | 287.00 |
| MSA/Core MSA | 0.70 | 0.66 | 1.00 |
| ZSA/Core ZSA | 0.66 | 0.73 | 1.00 |
| BD, g/cc | 0.79 | 0.87 | 0.77 |
| AV Part, size, μ | 93.00 | 92.00 | |
| Roller Attrition Testing (RAT) | | | |
| 0–20 min., wt. % | 9.86 | 10.86 | 10.29 |
| 20–80 min., wt. % | 6.43 | 9.00 | 6.00 |
| 0–80 min., wt. % | 16.29 | 19.86 | 16.29 |

The above catalysts were then subjected to the MAT testing set forth in Example 3. Prior to testing, the catalysts were steamed for 4 hours at temperatures of 1500° F. and 1450° F. The control of Example 16 was tested, unblended at 1500° F. but was tested as a 67:33 blend with the activity adjusting kaolin microsphere described in Example 4 at 1450° F.

The results obtained are shown below:

TABLE 8

MAT Activity Penalty for Clay-Free Shell

| | Example 14 Clay-Free | Example 15 Clay Shell | Example 16 Control |
|---|---|---|---|
| Activity for 1500° F. Steaming | | | |
| Activity | 1.43 | 1.85 | 2.89 |
| Penalty beyond Dilution | −26% | −4% | |
| Activity for 1450° F. Steaming | | | |
| Activity | 2.13 | 2.74 | 2.92 |
| Activity Penalty | −27% | −6% | |

One would expect the undiluted activity of the shell catalysts (Examples 14 and 15) to decline by ⅓ over the control since they have been diluted with shell. Thus, the 2.89 activity of the control should have been diluted to an activity of 1.93 if only dilution were occurring. As can be seen, the catalyst of the invention (Example 15) had an activity of 1.85 whereas the silica-only shell (Example 14) suffered an unacceptable activity loss of 26% beyond dilution.

The 1450° F. results confirmed the 1500° F. steaming results. As noted above, the 1450° F.-steamed control catalyst was diluted to 67 control:33 inerts, in order to give manageable MAT conversions. The coated catalysts were also diluted to 67 core:33 inert shell, by virtue of the coating. As can be seen, the catalyst of this invention suffered only a 6% activity penalty beyond dilution whereas the silica-only catalyst suffered a 27% loss in activity beyond dilution.

APPENDIX
Revised Engelhard Method for Roller Attrition Test

1. Scope
   The Roller Attrition apparatus is a modified separation test for dry, finely divided fluid cracking catalysts. Engelhard uses this test to determine attrition resistance.
2. Applicable Documents
   2.1 Instruction for Roller Particle Size Analyzer by the American Instrument Co., Inc., Silver Spring, Maryland
3. Summary of Method
   3.1 A specific weight of catalyst is charged to a sample tube at the bottom of a settling chamber. The sample T-tube is connected to an air supply. A collection thimble is mounted in a gooseneck tube at the tope of the chamber. An air activated vibrator connected to the settling chamber is turned on. At the same time, the air supply, regulated to a specific velocity and relative humidity and delivered through a calibrated nozzle, is started. The particles smallest in size are carried with the air stream through the chamber to the collection thimble, while the heavier particles fall back down into the sample tube.
4. Apparatus
   4.1 Rotometer: A Matheson 604 rotometer is used to accommodate a flow of approximately 14 1/min.
   4.2 Pressure Regulators: 2 Matheson line regulators Model No. 342
   4.3 Jet Nozzle: A 0.059 inch opening is used on the nozzle for the air supply delivery.
   4.4 Base and Frame Assembly: Supports the settling chamber and vibrating mechanism.
   4.5 Settling Chamber: A cone-shaped cylinder, open at both ends through which particle separation takes place.
   The cylinder is made of stainless steel.
   4.6 Sample T-tube: Attached to the Jet Nozzle and the Settling chamber provides the medium in which attrition actually takes place.
   4.7 Vibrating Device: Vibrates the cylinder to aid in the dislodging of particles from the chamber walls. It is driven by air at a pressure of 36 psig. Vibco, Inc; Turbine Vibrator #VS-130.
   4.8 Gooseneck Tube: Connects to the top of rhe chamber. A thimble to catch fines is attached to the other end.
   4.9 Thimbles: Whatman cellulose, single thickness extraction thimbles are used. Their measurements are:
   internal diameter × external length = 43 mm × 123 mm;
   external diameter × external length = 45 mm × 123 mm.
   4.10 Stopwatch or Timer.
   4.11 Crucibles: Medium highform, Coors, 50 ml, VWR No. 23810-189. Lid, VWR No. 23811-137. Crucibles should be used with a cover when calcining.
   4.12 Aluminum Weighing Dishes.
   4.13 Water Bottle: One water bottle, "Q" Glass Co., No. QB-1000, 2.5 gal., with specified modification of moving the hose connection from the bottom of the bottle to the neck. Bottle contains one gallon of D.I. water and is connected to the air supply. The air is then bubbled through four gas dispersion tubes with coarse frits in the water to maintain a constant humidity of about 50% and to dampen any air line surges. A minimum of 2000 ml of water should be in the bottle during use.
   Air pressure should be at approximately 25 psig.
   4.14 Humidification Desiccator: Acrylic desiccator with hygrometer, Cole-Parmer, No. N-08906.00. Provides

APPENDIX
Revised Engelhard Method for Roller Attrition Test
*-continued* proper moisture to the samples before testing. Desiccator floor contains water at room temperature for this purpose.

4.15 Equilibrium Chamber: Same as 4.14. Provides proper moisture to the thimbles before testing. Chamber contains a 12 cm. diameter culture dish containing water. Chamber contains 2 holes each 3 cm. in diameter to disperse excess moisture at room temperature.

5. Test Preparation for Samples (See Section 8 for Reference Information)

5.1 Equilibrate the extraction thimbles for a minimum of 24 hours in room atmosphere in the equilibration chamber.
    5.2 Dry the sample for 2 hours in a muffle oven set at 1100° F,. in covered crucibles. Cool on the table top for 2 hours.
    5.3 Pour muffled sample into an uncovered shallow dish or pan and place it in the humidification desiccator for minimum of 24 hours or until the starting hygrometer reading is reached after samples are placed in the dessicator.

6. Procedure 6.1 Turn on air to system and allow to equilibrate for about 5 minutes with valve set on 'vent'.
    6.2 Remove and weigh a thimble from the equilibration chamber and connect it to the gooseneck tube. Connect the gooseneck tube to the top of the settling chamber and secure it with masking tape.
    6.3 Weigh a 7.00 gm sample from the humidification desiccator on an aluminum weighing dish and place in the T-tube. Weight and record sample and T-tube.
    6.4 Connect the T-tube to the bottom of the settling chamber. Connect the air supply lines to the T-tube and the vibrator. Pay close attention to alignment marks to be sure they are set correctly.
    6.5 Simultaneously start the airflows to the T-tube and vibrator. Pay close attention to alignment marks to be sure they are set correctly.
    6.6 After run time is complete, stop the air to the T-tube Stop vibrator and stopwatch.
    6.7 Disconnect air supply and take the T-tube off the chamber bottom. Weight and record the sample and T-tube. Reattach the T-tube to the settling chamber.
    6.8 Repeat steps 6.6 through 6.7 an additional 30 minutes each for the 50 and 80 minute marks.
    6.9 After the 80 minute mark, disconnect air supply and take the T-tube off the chamber bottom. Remove the gooseneck tube and thimble from the settling chamber. Tap on the gooseneck tube to loosen fines so they settle into the thimble. Remove the thimble from the gooseneck.
    6.10 Place the thimble under the settling chamber and tap repeatedly to dislodge the fines so they fall into the thimble. Weigh and record the thimble.
    6.11 Clean the settling chamber, T-tube and gooseneck tube with air.

7. Calculation Procedure and Report

The Roller attrition data is defined as the slope of percent weight loss (%) vs time (hour). It has the unit of "% Wt. Loss/hr.". The slope is the linear correlation of percent weight loss at the 20, 50, and 80 minute marks of section 6.5 to 6.8.
    Correlation coefficient and recovery should be >95%. Recovery is defined as the weight ratio of sample recovered in the T-tube and thimble to the starting sample.
    Example:

| | | |
    |---|---|---|
    | A. | Starting sample weight | 7.00 gm |
    | B. | T-Tube + sample weight, step 6.3: | 497.46 gm |
    | C. | T-Tube + sample after 20 min, step 6.7: | 497.09 gm |
    | D. | T-Tube + sample after 50 min, step 6.8: | 496.88 gm |
    | E. | T-Tube + sample after 80 min, step 6.8: | 496.74 gm |
    | F. | Starting thimble weight, step 6.2: | 7.37 gm |
    | G. | Thimble + sample weight, step 6.10: | 7.88 gm |

Recovery Calculation

| | | | |
    |---|---|---|---|
    | a. | Weight gain in thimble = | G-F | = 7.88 − 7.37 |
    | | | | = 0.51 gm |
    | b. | Weight loss in T-Tube = | E-B | = 796.74 − 797.46 |
    | | | | + −0.72 gm |
    | c. | Net weight = | | 7.00 + 0.51 − 0.72 |
    | | | | = 6.79 gm |
    | d. | Recovery = | | (6.79/7.00) * 100 |
    | | Recovery = | | 97.0% |

Roller Calculation

| Time, min | Weight Loss, gm | Weight Loss, % |
    |---|---|---|
    | 0 | 0 | 0 |
    | 20 | 0.37 | 5.29 |
    | 30 | 0.58 | 8.29 |
    | 50 | 0.72 | 10.29 |

Linear Correlation:
    | | | |
    |---|---|---|
    | Slope | - | 0.08333 % wt loss/min |
    | Intercept | | 3.78% |
    | Cor. Coeff. | | 0.986 |

Roller = 0.08333% wt loss/min * 60 min/hr
    Roller = 5.0% wt loss/hr

8. Test Preparation for a Reference 8.1 Dry the reference for 2 hours in a muffle oven set at 1100° F. in covered crucibles. Cool in a covered desiccator for at least 2 hours before using. Large amounts of reference can be muffled at one time for long term use as long as it remains in a desiccator to prevent moisture absorption.

9. Procedure 9.1 Turn on air to system and allow to equilibrate for about 5 minutes with valve set on 'vent'.
    9.2 Thimbles can be used directly from the box. There is no need to weight it. Connect it to the gooseneck tube. Connect the gooseneck tube to the top of the settling chamber and secure it with masking tape.
    9.3 Weight out 7.00 gms of reference material on an aluminum weighing dish and record. Place it in the T-tube.
    9.4 Connect the T-tube to the bottom of the settling chamber. Connect the air supply lines to the T-tube and the vibrator. Pay close attention to alignment marks to be sure they are set correctly
    9.5 Simultaneously start the airflows to the T-tube and vibrator and start the stopwatch. Set air flow rates to the proper settings after one minute. Run for exactly 60 minutes.
    9.6 After run time is complete, stop the air to the T-tube. Allow vibrator to run an extra minute to loosen any catalyst remaining on the chamber walls.
    9.7 Disconneot air supply and take the T-tube off the chamber bottom. Weight and record the sample.
    9.8 Remove the gooseneck tube and thimble from the settling chamber. Clean the settling chamber, T-tube and gooseneck tube with air. The thimble can be disposed of. Its weight is not necessary for calculations.

10. Calculation Procedure and Report 10.1 The final weight of reference left in the T-Tube should be between 5.0 and 5.3 grams (24.3%−28.6% loss).
    If reference is within these limits, test is considered calibrated and samples can be run. If the reference is not within acceptable limits, make adjustments to the air flow entering the T-tube and rerun another reference.

What is claimed is:

1. A process for the fluid cracking of metal-containing gas oils which comprises contacting the same at elevated temperatures with a zeolite-containing fluid cracking catalyst coated with a shell, said shell having a microactivity of less than 20 and characterized by either being sinterable or having a surface area less than $50M^2/g$, said shell being a mixture of at least one hydrous refractory metal oxide or silicate including precursor thereof having an average particle size of 0.3 to 5 microns and a refractory inorganic binder having a particle size no greater than 0.01 microns, said shell being 10 to 80 weight percent of the total catalyst.

2. A process for the fluid cracking of metal-containing gas oils which comprises contacting the same at elevated temperatures with a zeolite-containing fluid cracking catalyst coated with a shell comprising clay and a source of silica and said shell is from 10 to 60 weight percent of the total catalyst.

3. The process of claim 2 wherein the ratio of clay to silica is from 75:25 to 50:50.

4. The process of claim 3 wherein the source of silica is sodium silicate.

5. The process of claim 4 wherein the shell comprises 20 to 40 weight percent of the total catalyst.

6. The process of claim 5 wherein the shell comprises 33 weight percent of the total catalyst and the clay to silica weight ratio is 60:40.

7. The process of claim 6 wherein said zeolite is zeolite Y.

* * * * *